INVENTORS
SYLVAN SILBERG
RANSOM D. SLAYTON

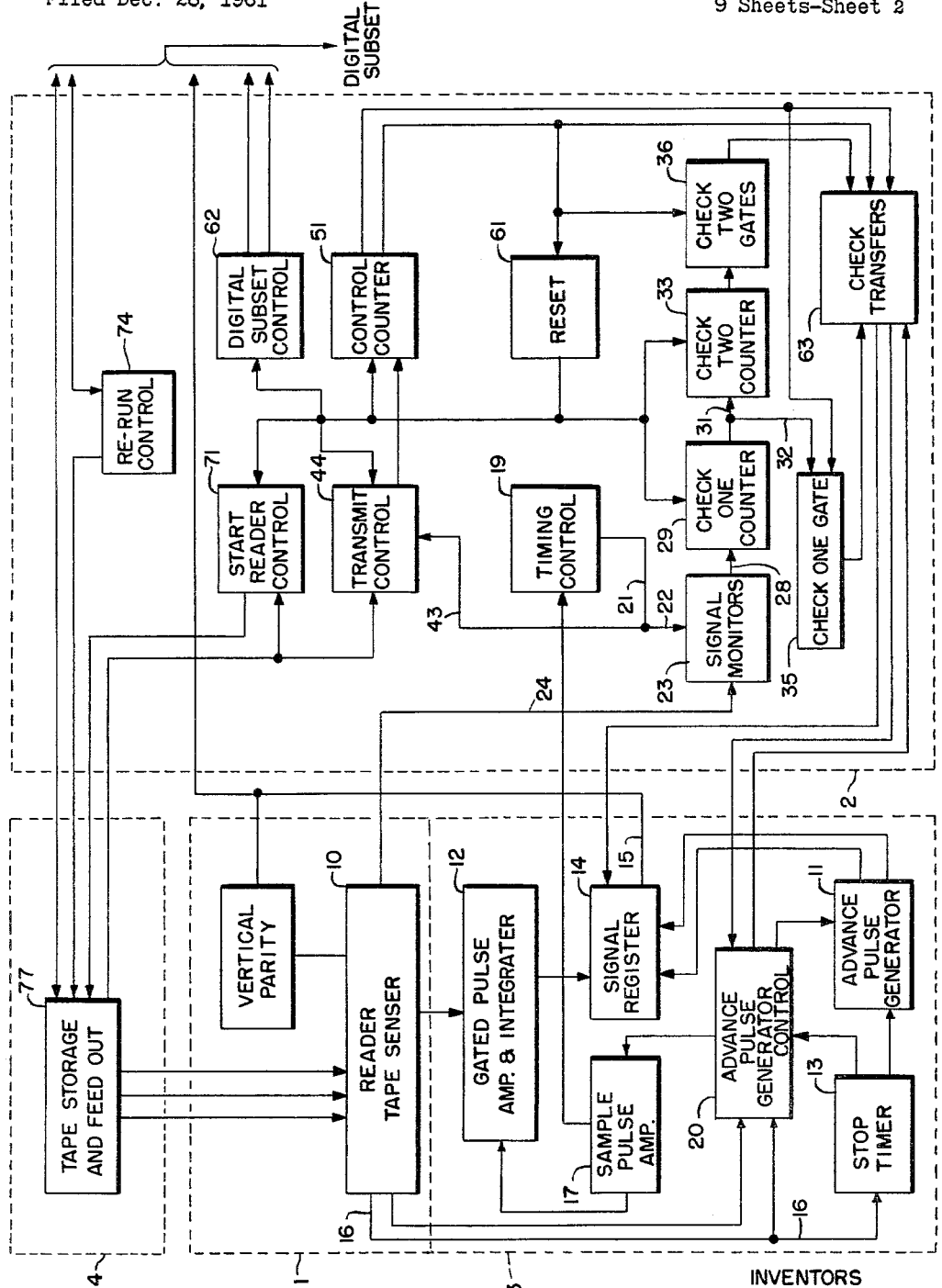

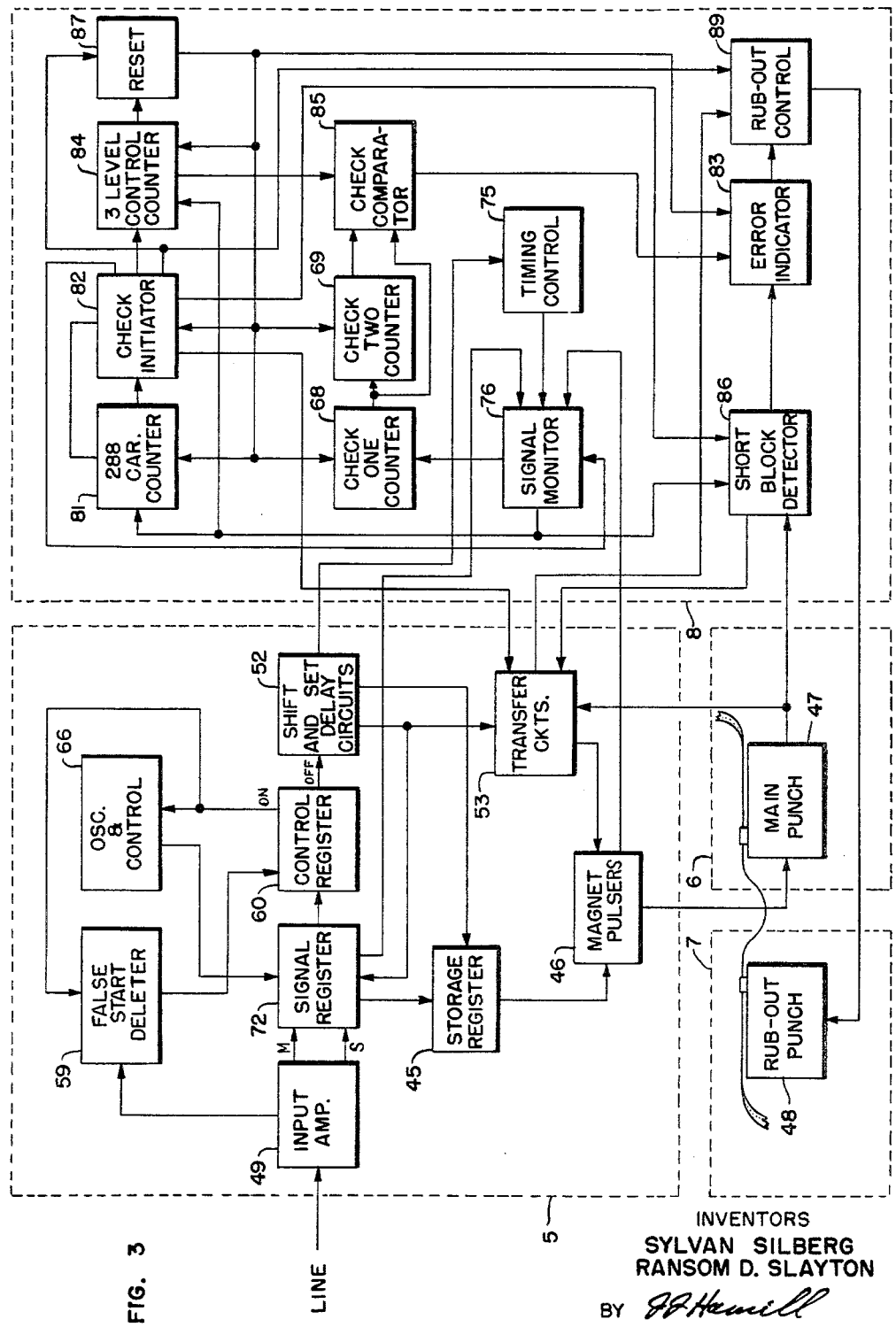

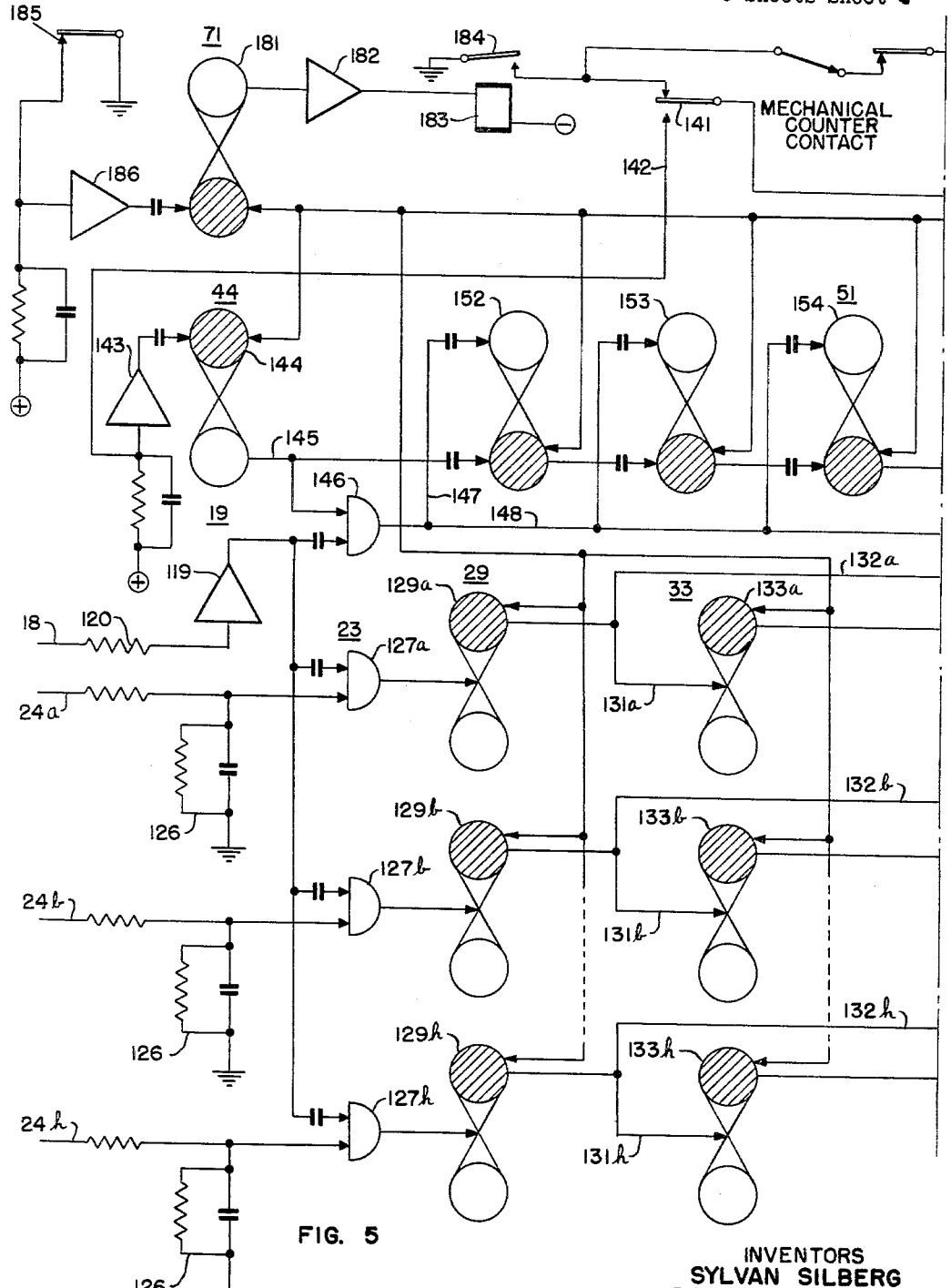

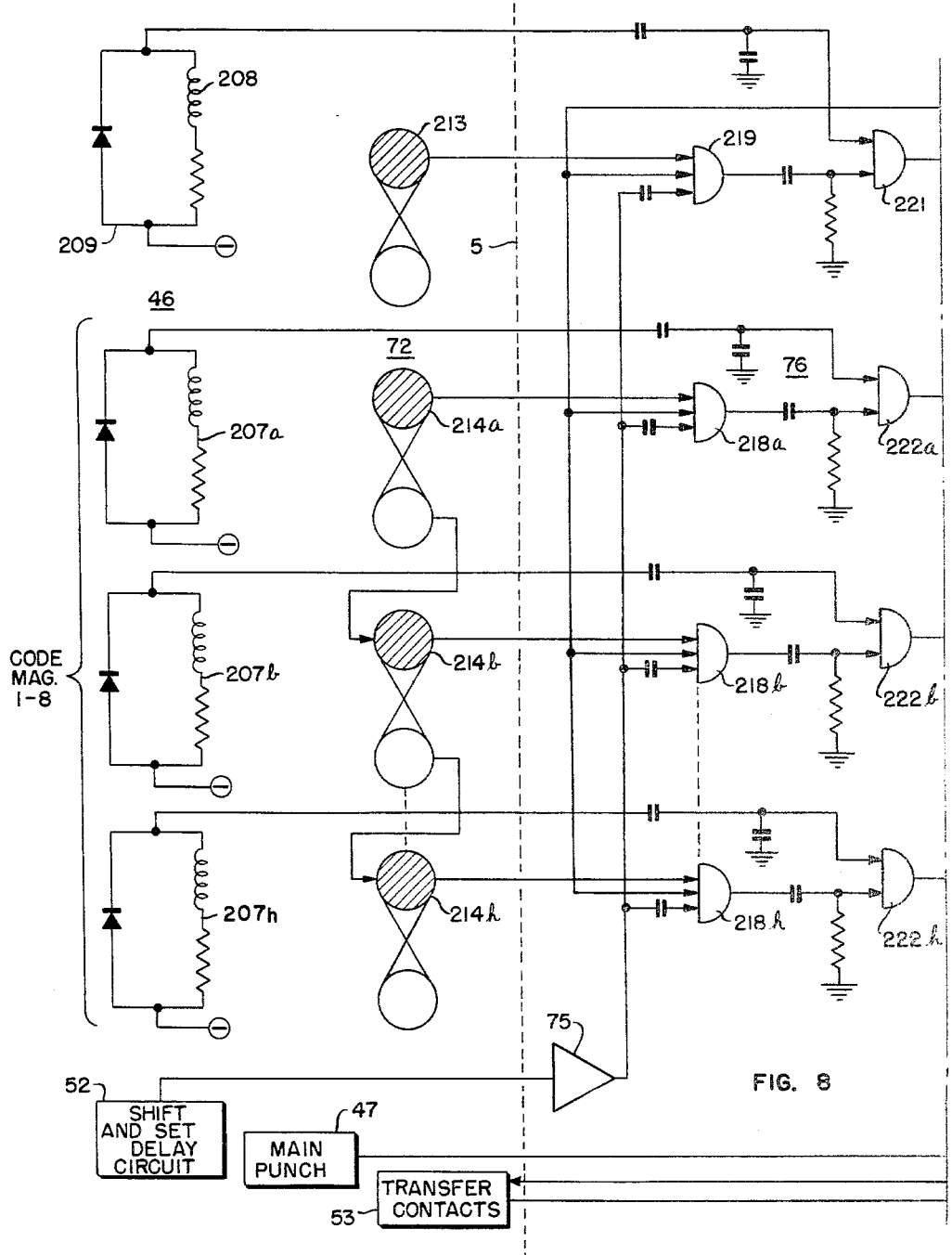

INVENTORS
SYLVAN SILBERG
RANSOM D. SLAYTON

INVENTORS
SYLVAN SILBERG
RANSOM D. SLAYTON

INVENTORS
SYLVAN SILBERG
RANSOM D. SLAYTON
BY *J.J. Hamill*
ATTORNEY

United States Patent Office 3,242,461
Patented Mar. 22, 1966

3,242,461
ERROR DETECTION SYSTEM
Sylvan Silberg, Skokie, and Ransom D. Slayton, Glenview, Ill., assignors to Teletype Corporation, Skokie, Ill., a corporation of Delaware
Filed Dec. 28, 1961, Ser. No. 162,649
12 Claims. (Cl. 340—146.1)

This invention relates to an error detection and correction system for printing telegraph systems and more particularly to error detection and correction systems in which errors are detected by counting pulses of one condition in the telegraphic character signals.

In prior error detection and correction systems, a single one of several methods of error detection is performed over a variable number of characters with the normal amount of characters being a line length of approximately 72 characters. Thus, a single check character is transmitted for each line and the amount or redundancy is of a relatively high order, namely, one character for approximately every 72 characters. Furthermore, when using only one method of error detection, the accuracy is limited by the inherent limitations in the method being used, for example, in the horizontal parity method, a loss or gain of an even number of marking pulses in a level will not be detected by the binary counting of the marking pulses in that level. Also, the prior correction systems were inefficient in that the message block containing an error was deleted at the receiving station before retransmission and re-recording of the message block was commenced. Accordingly, the present invention is directed to the elimination of the disadvantages in the prior error detection and correction systems and, to this end, employs complementary methods of error detection over longer and fixed blocks of characters and deletes a block containing an error at the receiving station while simultaneously re-recording the retransmitted block.

An object of the present invention is to provide complementary error detecting methods to reduce the number of errors that would go undetected by the use of a single error detecting method.

Another object of the invention is to eliminate the end-of-line recognition circuitry by performing an error check over a fixed length block of characters wherein the number of characters in the block has been predetermined to minimize redundancy and to a maximize efficiency of transmission time.

Another object of the invention is to count the characters being transmitted at both the sending and receiving stations and, after a predetermined count has been reached, to initiate the sending of the check character to the receiving station for comparison with the check character generated at the receiving station.

Another object of the invention, in tape medium recording systems, is to blind the recording device at the receiving station from recording the check character into the tape at the receiving station whereby the tapes at the sending and receiving stations are identical and contain only the message information.

Another object of the invention is to cancel from the recording medium at the receiving station, through the over-recording of a "rub-out" signal, the block of characters containing an error while simultaneously re-recording the retransmitted block at the receiving station.

Another object of the invention is to synchronize the driving of the recording device and the deleting device whereby a length of tape equal to one message block is continually maintained between the devices.

Another object of the invention is to measure the time interval between individual characters in a block in process and, upon expiration of a time interval in excess of the normal time interval without the receipt of a character, to initiate the feeding of the tape by a main and rub-out recording device until they have cycled through the predetermined number of cycles constituting the block length thereby maintaining the main and rub-out devices in synchronism with the tape reader at the transmitting station.

Another object of the invention is first to binarily count the number of pulses of one condition being transmitted in each level of the characters and then to count binarily the number of whole pairs of pulses of one condition first binarily counted whereby the addition or loss of pulses will be detected unless the total number of lost or added pulses is a number divisible by four.

In accordance with the invention, a tape reader at the transmitting station transmits binary digits (bits) having one of two conditions to a recording device at the receiving station. Parity counters at the transmitting and receiving stations count the bits of one condition occurring at the respective stations during the block. A character counter at the transmitting station counts the number of characters transmitted and, after counting through a predetermined number of characters, the character counter initiates the sending of the count made in the parity counters as parity check characters for comparison with the parity check characters formed by the parity counters at the receiving station. A character counter at the receiving station counts the number of cycles of the recording device and, after counting through a predetermined number of cycles, the character counter blinds the recording device from recording the transmitted parity check characters and enables the comparison of the transmitted check character with that generated at the receiving station. If there is agreement between check characters, no error has been detected and transmission of the next block, if any, is commenced. If there is a lack of agreement between parity check characters, the transmitting station is notified to retransmit the prior message and the rub-out device is enabled to cancel the message containing an error simultaneously with the re-recording of the message by the recording punch. A non-sequence timer or short block detector determines whether or not there has been a receipt of successive characters during a predetermined time interval. Upon the expiration of the time interval without a character having been received, the non-sequence timer causes a cycling of the recording device and rub-out device until the character counter stops the cycling of the devices at the end of the normal block of characters. The transmitting station is then notified to re-transmit the last block. The type of recording medium utilized is not pertinent to the spirit of the invention, punched tape readers and punches and magnetic tape readers and recorders, both being employed in the communications art and adaptable to the principles described.

Other features and advantages of the invention will become apparent from the following detailed description of a punched tape system when considered in conjunction with the accompanying drawings wherein:

FIG. 2 is a block diagram of the transmitting station;

FIG. 3 is a block diagram of the receiving station;

FIG. 4 shows the proper arrangement for assembling FIGS. 5 and 6;

FIGS. 5 and 6 are circuit diagrams of the transmitting station;

FIG. 7 shows the proper arrangement for assembling FIGS. 8, 9, 10 and 11, and

FIGS. 8, 9, 10 and 11 are circuit diagrams of the receiving station.

*General description*

Briefly, the present invention employs a tape reader which senses a perforated tape level by level and which transmits code pulses in parallel form to an electronic transmitter wherein the parallel signals are converted from parallel form into serial form for transmission in the manner of normal printing telegraph signals. The sensing means of the tape reader is monitored by binary counters which binarily count the marking pulses horizontally over a plurality of levels, and, optionally, for greater error detecting power, vertically within a row in the conventional manner. The vertical binary sum may be transmitted as an additional code level. Upon the sensing of a predetermined number of characters in a message, a mechanical counter disables the tape reader from sensing further characters and enables circuitry for reading out the horizontal binary count of marking pulses in each level. Pulses representative of these binary counts in each level are converted from parallel pulses to serial pulses in the electronic transmitter, in a manner similar to that performed on the pulses representing a character in a message, and are transmitted to the tape reperforator at a receiving station. At the receiving station the incoming marking pulses are binarily counted horizontally level by level, and optionally, within a vertical row in a character, as the message is being recorded by perforating a tape. A counter in the receiving station counts the number of characters received and, after having received the predetermined number of characters constituting the message block, inhibits the reperforator and enables the comparison of the horizontal binary counts formed at the receiving station with the binary counts formed at the transmitting station and transmitted as check characters. Agreement between the check characters, and with the optional vertical parity sums of individual characters, will signify that no error has occurred during the transmission of the message block; whereas a lack of agreement between check characters (or vertical parity sums) will indicate that an error has occurred during transmission of the message block. To automatically correct a detected error, the receiving station notifies the transmitting station that an error has occurred and, upon receipt of such a notifying signal, the perforated tape containing the previously transmitted message block is pulled back to the beginning of the message block and retransmitted. At the receiving station the rub-out punch is enabled to overpunch the errored message block with "letters" characters to cancel the message containing an error while simultaneously the retransmitted message is being punched in the tape by the reperforator.

Figure 1:
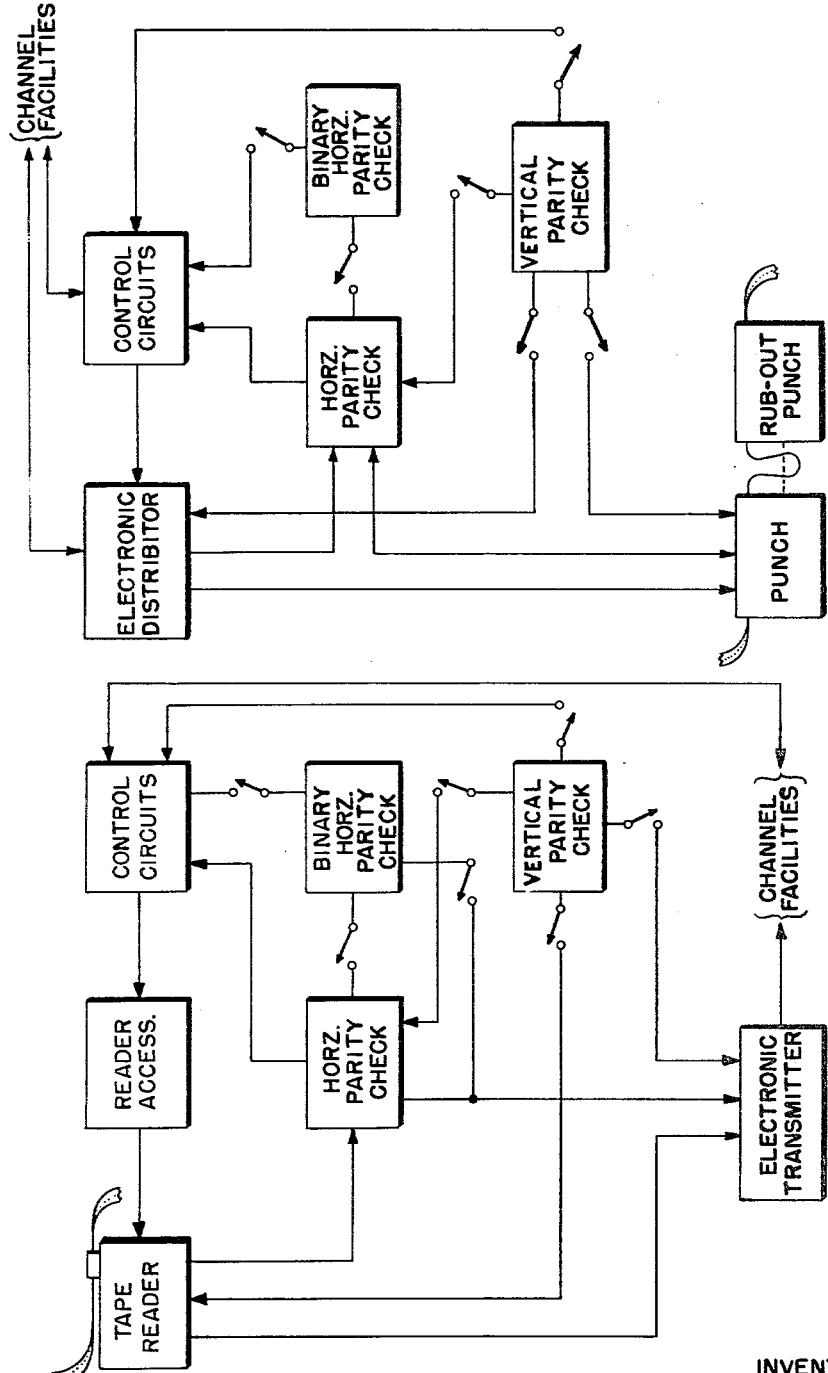
FIG. 1 is a block diagram illustrating the various parity check counters that are employed in the error detection and correction system according to the invention.
Figure 6:
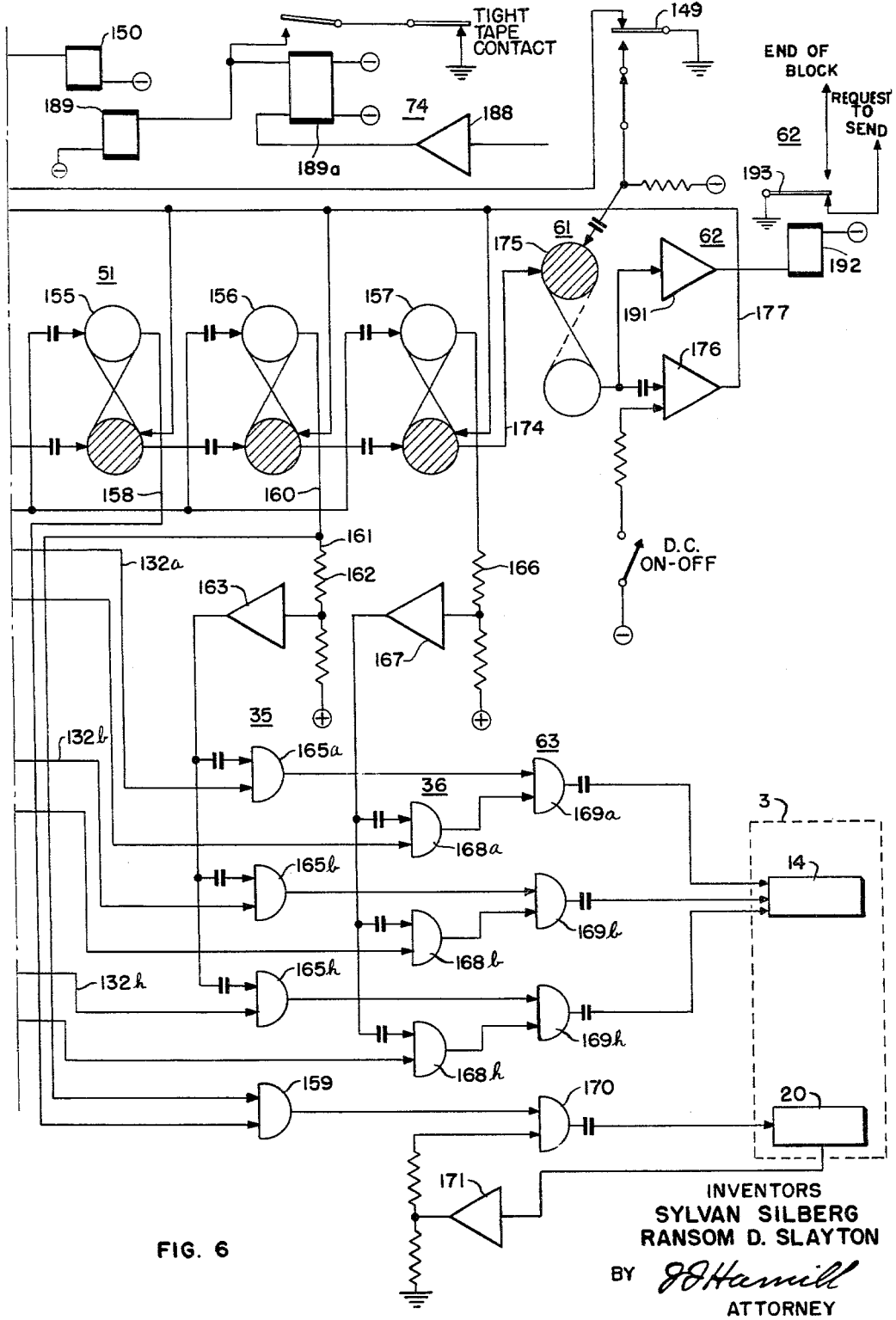
Figure 9:
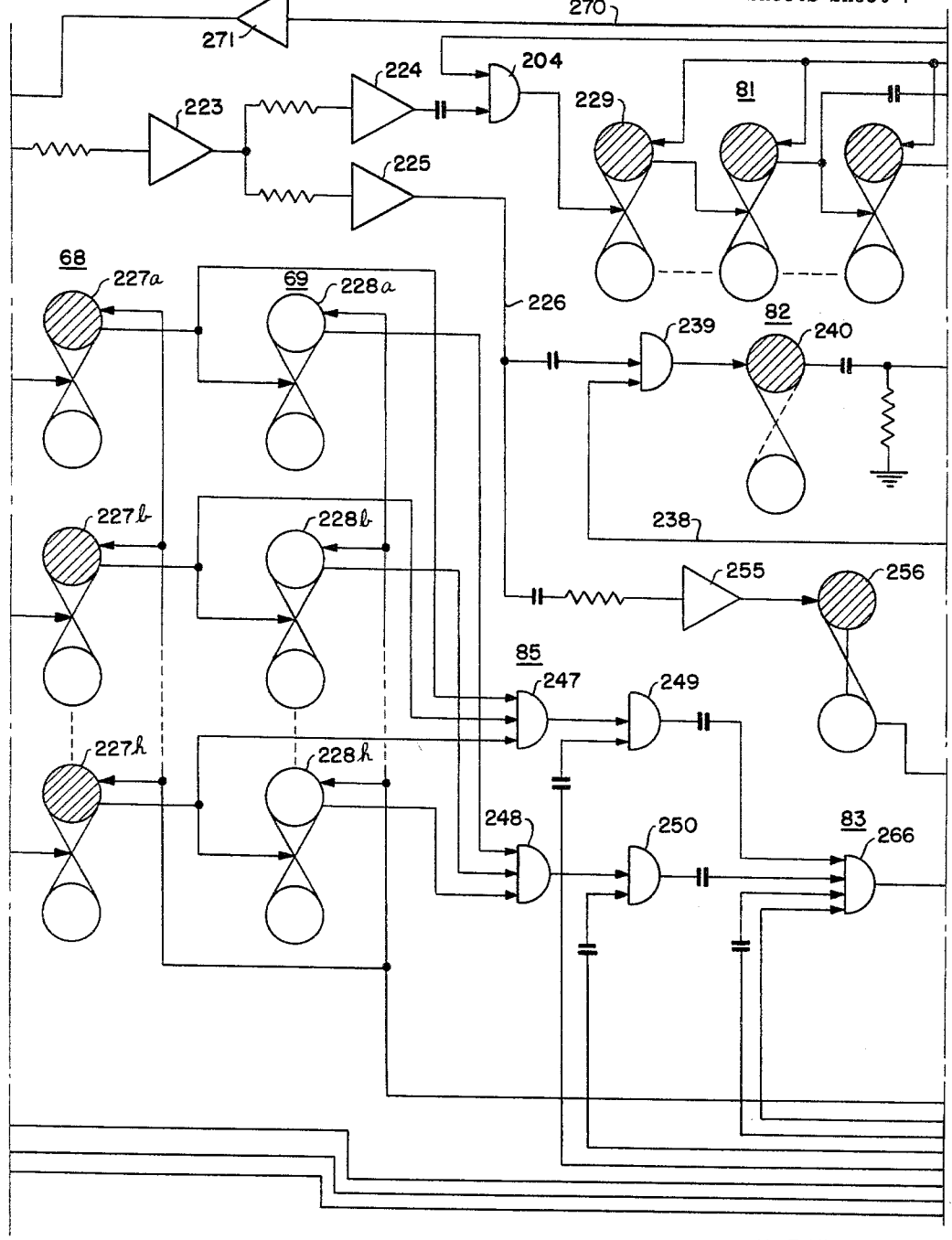
Figure 10:
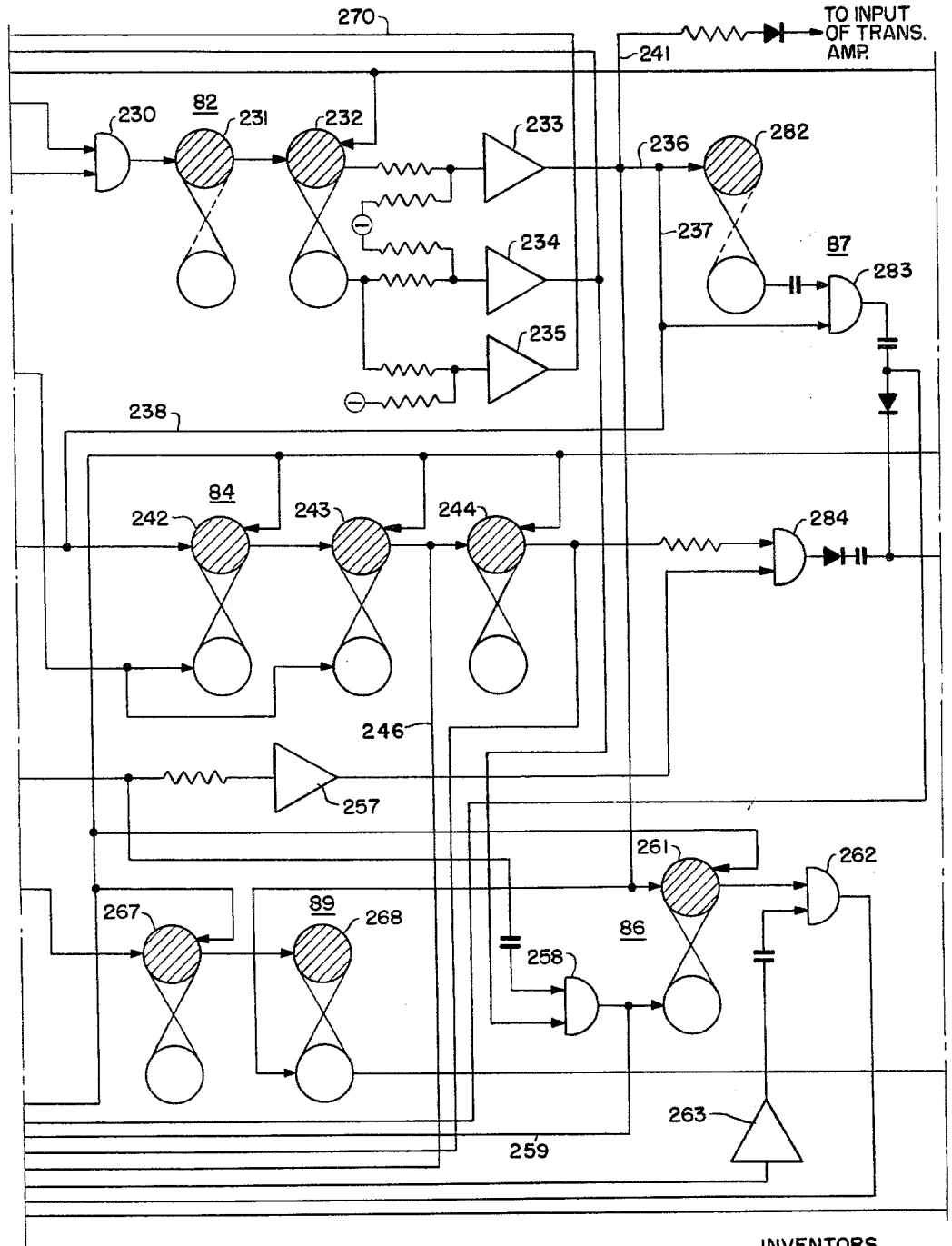
Figure 11:
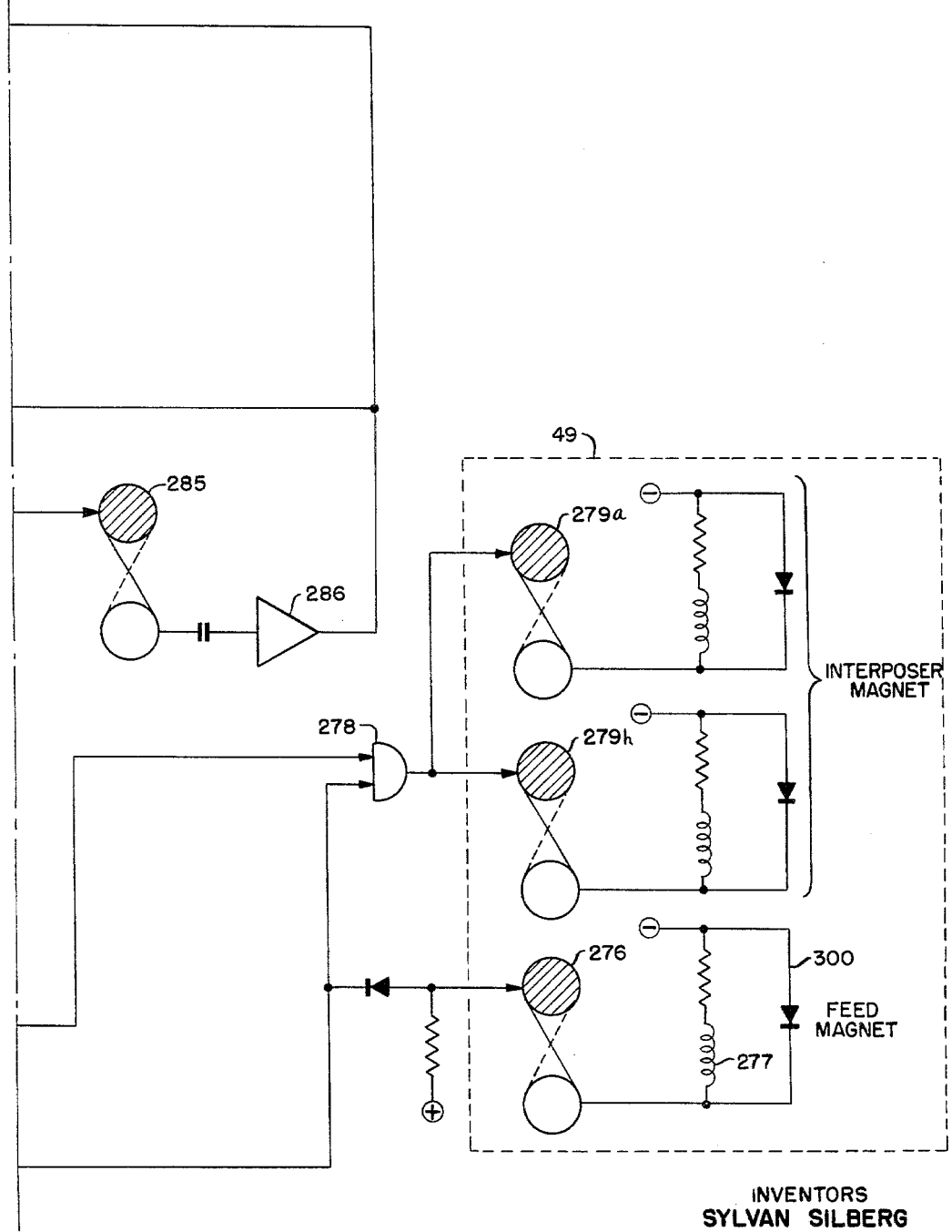

Referring now to FIG. 1, there is shown in block form, three error control accessory blocks, each of which represents a separate method of detecting errors, viz., horizontal, vertical and binary horizontal. The operator can select the desired method of error detection by closing the appropriate switches at the transmitting station thereby connecting the chosen error control accessory block to a tape reader, control circuitry, and electronic transmitter. Thus, the selected error control accessory block will monitor the output of the reader and upon conditioning by the control circuitry will present its parity count to the electronic distributor for transmission to the receiving station. At the receiving station, the selected error control accessory block is connected to the selector to monitor the incoming pulses operating the punch and is controlled by the control circuitry to perform the comparison between the transmitted parity check character and its own check character. With the combining of a greater number of error detection methods in any one communications system, it is possible to detect errors with a greater degree of accuracy.

These error detection methods have in common the feature of making a parity check over a group of code pulses both at the transmitting and receiving stations and comparing the summations for agreement. That is, making an odd-even summation of the marking pulses within a group of marking and spacing pulses to determine whether the total number of marking pulses within that group is an odd number or an even number. Thus, by assigning to an odd summation of marking elements a particular symbol, such as another marking element, and to an even summation of marking elements a particular symbol, such as a spacing element, it is possible to transmit, to a receiving station, the result of these summations made at the transmitting station, in the form of a check character.

The vertical parity check system as used in this application refers to the counting of marking pulses within a character and derives its name from the fact that when a tape is being sensed or punched, the marking and spacing positions representing a character are in a straight vertical line or row on the tape. It is possible by means of vertical parity to detect whether or not each character has gained or lost a marking pulse during transmission by making the total number of marking pulses within a character either consistently odd or consistently even. That is, an additional bit will be added, in an additional level, to those characters wherein the odd-even summations differ from the parity being used. For example, in an even parity system, if the number of marking bits or pulses within a character is odd, an additional bit will be added to an extra level to make the summation even for an even parity system. While this system has the advantages of making a character-by-character parity check, it has the disadvantage of being highly redundant in that for each character an additional level is required wherein an additional marking bit can be transmitted to make the odd-even summation of the marking systems conform to the parity being used. Also, this method does not detect an even number of errors within one character, for example, where two or four marks are added or lost because of an equipment failure or long noise burst on a line during transmission of a character. As vertical parity check circuits are known in the art and as this is not the subject of the instant invention, the circuitry for vertical parity checking has not been included but reference may be had to United States Patent No. 2,713,084 for such a circuit.

The simple horizontal parity check system is an odd-even summation of the marking or spacing pulses in each of the levels over a plurality of characters forming a message block. The horizontal parity check system derives its name from the fact that an odd-even summation is made over each level which is horizontal and longitudinal of the perforated tape. The simple horizontal parity check system can be less redundant than the vertical parity system since one check character can be sent for a large number of traffic characters within a message block. Hence, one check character can be transmitted for a block sufficiently large in size to reduce the redundancy, e.g., in the instant case to as little as one per cent, whereas the redundancy in a vertical parity system is much higher as it is one bit per number of total bits in a character. However, the simple horizontal parity system does not detect even numbers of errors made in a given level.

The binary horizontal parity check method is the making of odd-even summations of the odd-even summations previously made by using the simple horizontal parity system. In the instant application, the outputs of the binary counters for the simple horizontal parity check system are directed to an additional set of binary counters for each level wherein an odd-even summation is made of the marking pulses received in the binary counters of the simple horizontal parity check system. With the simple horizontal parity check method, the addition of or loss of two of the marking elements in a level during transmission goes undetected as the counter for that level at the transmitting station will be in the same state as the counter at the receiver. However, with the addition of binary horizontal parity checking, the addition of or loss of two of the marking elements in a level during transmission will be detected as the counter for that level at the transmitting station will be in a state differing from that of the counter for that level at the receiving station. Thus, it is possible to detect an even number of errors or an odd number of errors occurring along a horizontal line with the single exception of not being able to detect the loss of four marking pulses within a level or any multiple of four. Manifestly then, it is possible to attain greater accuracy with binary horizontal parity than with the simple horizontal parity check system.

*Transmitting station*

Referring now to the block diagram in FIG. 2, wherein is illustrated the transmitting station, dotted lines divide the figure into four functional blocks, namely, a reader block 1 wherein the tape is read, an electronic error control accessory block 2 wherein the binary counting of marking pulses is being performed, an electronic transmitter block 3 wherein the parallel signals from the tape reader are being converted to sequential form, and the reader control accessory block 4 wherein a tape pull-back mechanism is provided for returning a message perforated in a tape to its original starting position. The tape reader and reader control accessory are described in United States Patent No. 2,989,590, issued to Jerome L. De Boo on June 20, 1961, which is incorporated herein by reference. The tape reader 10 senses a perforated tape column by column, and sends out either a marking or spacing pulse over each transmission level and over a separate lead furnishes a clock pulse from a magnetic pickup for timing purposes during each character cycle. The magnetic pickup pulses are sent from the tape reader 10 over a lead 16 to the electronic transmitter block 3 to keep it in timed relationship with the tape reader 10.

The electronic transmitter is of a type well known in the art and will be briefly described herein insofar as need be to integrate it functionally with the tape reader 10 and error control accessories 2. As the tape reader 10 begins to cycle after being turned on, the tape reader 10 generates a clock pulse once each cycle irrespective of whether or not a character is being sensed by the reader. The clock pulses go over a lead 16 to turn off a flip-flop (not shown) in the advanced pulse generator control 20 and turn on the stop timer 13, which has a one shot multivibrator therein. A universal contact in the reader closes only during the sensing of a character and its output also goes to the advance pulse generator control 20. After one-half of a pulse length duration, the stop timer 13 times out and primes the advance pulse generator control 20 which will be driven by a pulse due to closing of a universal contact in the reader 10. The advance pulse generator control 20 first causes the advance pulse generator 11 which has a start-stop oscillator therein to generate a reset pulse which sets all elements of a signal register 14 to space. Also, the advance pulse generator control 20 causes a sample pulse amplifier 17 to produce a sample pulse which examines the tape reader parallel line inputs to gated pulse amplifier and integrator circuitry 12. All levels in the amplifier and integrator circuitry 12 that are in the marking condition cause their corresponding levels in the signal register 14 to go to the marking condition. After a one-half bit duration, the advance pulse generator 11 produces an advance pulse which causes all the elements of the signal register 14 to shift the stored information one level to the right. The advance pulse generator 11 continues to produce advance pulses which cause each of the pulses of the character to be applied serially over the line 15 to the digital subset for transmission over voice channels. The first element of the signal register is a spacing or start element followed by the elements of the code and a stop pulse. That is, the first element of the shift register is always spacing as it receives no input from the gated pulse amplifier and integrator circuitry 12 and the last element is always primed to mark to afford a stop pulse and it likewise has no input from the gated pulse amplifier and integrator circuitry 12. The next clock pulse that goes in the character advance pulse generator control 20 turns if off, stopping the oscillator contained in advance pulse generator 11, which will remain in this stopped condition until the tape reader 10 closes the universal contact when reading the next character.

The sample pulse amplifier 17 sends a timing pulse to a timing control 19 which furnishes a sampling pulse to the signal monitors 23 over leads 21 and 22 in the error control accessory block 2. The signal monitors 23 determine which levels in the perforated tape have perforations therein by sampling the spacing contacts rather than the marking contacts associated with the tape sensing pins of the tape reader 10, there being a marking and spacing set of contacts in each level. The marking contacts are normally open contacts which upon closure furnish the marking pulses to the electronic transmitter 3 for transmission over the signal lines 15 to the receiving station. The normally closed spacing contacts are monitored rather than marking contacts to enable detection of an error should a marking contact become dirty. That is, since it is unlikely that both the marking and spacing contacts will become dirty at the same time, a marking contact that has become dirty continues to give a spacing pulse in the presence of a mark in the tape; and because the associated spacing contact will not be registering a closed contact, where a dirty marking contact is closed, the difference in the marks transmitted by a marking contact and those counted by the spacing contacts is susceptible to detection.

After receiving the pulses from the reader 10 and receiving the sampling pulse from the timing control 19, the signal monitors 23 send out a pulse, in those levels which are marking, over lead 28 to a check one counter 29. The check one counter 29 binarily counts the marking pulses received in each level, this being the horizontal parity count. The output of the check one counter 29 is fed over lead 31 to the check two counter 33, this being the binary horizontal parity count wherein another binary count is made of the marking pulses in each level. The check two counter 33 sends outputs to its check two gates 36 and the check one counter 29 sends its outputs over lead 32 to check one gates 35. Both the check one gates 35 and check two gates 36 send their outputs to check transfers 63 which sends the check characters to the electronic transmitter block 3 for distribution through signal register 14 over the lines 15 when the check transfer 63 has been appropriately conditioned by pulses indicating that it is the proper time for check character transfer.

It will be remembered that the timing control 19 sent a sampling pulse over lead 22 to the signal monitors 23. Simultaneously with said pulse to monitors 23 a pulse is sent over the lead 43 to a transmit control 44 which initiates the transmission of the check characters. The transmit control 44 also receives an input from the reader error control accessory block 4 when a mechanical counter therein has registered the sensing of a predetermined number of characters, 288 characters having been selected for the length of the character block in the preferred embodiment. The pulse from the reader error control accessory block 4 is the priming pulse and the transmit control 44 will emit a stepping pulse at intervals of one character cycle upon being pulsed by the timing control 19. The output of the transmit control 44 goes to a control counter 51 which functions to obtain proper timing between transmission of the last traffic character in a block of 288 characters and the transmission of the check characters from the check one counter 29 and check two counter 33. This delay is necessary since the operating magnet of the tape reader 10 must be given sufficient time to release and also because two character intervals of time are required for the recognition and comparison of the transmitted check characters at the receiving station. The outputs of the control counter 51 go to the check one gates 35 and the check two gates 36, to drive those gates which are sampling to a marking condition to produce positive pulses which go to a check transfer 63 for further distribution over the signal lines 15 by the signal register 14 in electronic transmitter 3.

Additionally, the check transfer 63 generates start pulses for the check characters which it is transferring to the electronic transmitter 3. Check transfer 63 receives a pulse from the advance pulse generator control 20 as well as priming pulses from an electronic control counter 51 to supply a start pulse to the electronic transmitter 3 to start its advance pulse generator control 20 one hundred and fifty microseconds before the insertion of the marks into signal register 14.

Upon completion of a transmission cycle consisting of 288 traffic characters, a pause of two characters duration, and the two check chaarcters, the control counter 51 times out and sends a signal to reset 61 to reset all of the bistable devices to their initial condition and to notify a digital subset control 62 of completion of the transmission cycle.

Reset control 61 also sends pulses to a start reader control 71 for initiating the sensing of the new message block by the tape reader 10. After receipt of the reset pulse, the start reader control 71 sends a priming signal to the reader error control accessory block 4 which was previously shut off by the mechanical counter when it had counted through the predetermined number of characters. A rerun control 74 will be driven through a cycle of operation upon the receipt of an error signal from the receiving station and will cause the tape storage and feed-out control 77, in the reader error control accessory block 4 to energize the tape pull-back mechanism, shown in the aforementioned De Boo Patent No. 2,989,590, for pulling back that portion of the tape in which the message containing an error originated.

The reset 61 also energized a relay in the digital subset control 62 to open a contact for a "request to send" circuit and close a contact in an "end of block" circuit. Thus, during the interval timed out by the reset 61 it is possible for the receiving station to notify the transmitting station that an error has been detected.

*Receiving station*

Referring to the block diagram of FIG. 3, there is illustrated a receiving station in block form having as components an electronic receiver block 5 for converting serial pulses to parallel pulses, a main punch block 6 for perforating the message, a rub-out punch block 7 for deleting a block containing a detected error and an electronic error control accessory block 8 for performing parity generation and comparison operations. A functional description of each of these component parts will be undertaken before proceeding to the detailed description thereof in the circuit diagram shown in FIGS. 8–11, inclusive.

As with the electronic transmitter 3, the electronic receiver 5 is a conventional apparatus and hence will be briefly described only to the extent necessary to correlate it with the tape reperforator 6 and the electronic error control accessories 8. The serial marking and spacing signals enter the electronic receiver 5 where they are inverted and amplified by an input amplifier 49. The output of the input amplifier 49 is fed to a signal register 72 and to false start deleter circuitry 59. The false start deleter circuitry 59 monitors the line at all times to check for a start pulse that must be a minimum of one-half a bit in duration. When the false start deleter 59 detects a bonafide start pulse, it supplies a signal to a control register 60. The control register 60 sends a signal to start an oscillator and control 66 and blinds the false start deleter circuitry 59. An oscillator and control 66 then supplies advance pulses to the signal register 72, spaced one bit apart, until the start pulse coming in over the traffic lines is shifted into the control register 60. When the start pulse is shifted into control register 60, the oscillator and control 66 is turned off and shift and set delay circuits 52 are triggered, for a delay of 100 microseconds. After the shift and delay circuit 52 is triggered, it supplies a shift pulse to a storage register 45 allowing information to be transferred from the signal register 72 to the storage register 45. Two hundred microseconds after the shift and set delay circuit 52 is triggered, a reset and transfer prime pulse is generated. The reset pulse is fed back to the signal register 72 setting all elements to the marking condition. The transfer prime pulse is fed to a transfer circuit 53 where it is temporarily stored until the pickup pulse from the main punch 47 accepts the traffic from the storage register 45 through a magnet pulser circuit 46. At this time, a transfer pulse is generated to turn on the magnet pulsers 46 that are primed to the marking condition by the storage register 45.

Either from contacts on the punches themselves or from voltage dividers in the circuit of the magnet pulsers 46 the latter being utilized in the instant embodiment, a pulse is generated in each level that has received a marking pulse for transmission to a signal monitor 76. The signal monitor 76 determines when a character is received, what levels are marking, and furnishes check one and check two counters 68, 69 with a pulse over each level that is marking at the appropriate time, which is when a sampling pulse from a timing control 75 furnishes a drive pulse for the signal monitor 76. Of course, only those levels that are marking will be driven to send an output to the check one counter 68 and the check two counter 69. Because the check characters are never allowed to reach the magnet pulsers they are sampled in the signal register 72 to determine which levels are marking. A priming signal from a check initiator 82 after 288 characters, permits this sampling to be performed.

By sampling the magnet pulsers 46 of the tape feed magnet, the signal monitor 76 is able to count the characters being received and to advance a character counter 81 one digit for each of the 288 characters because the perforating operation for each of the 288 traffic characters is accompanied by a tape feeding operation.

The character counter 81 is a gated binary counter that is pulsed every time a character is punched and serves to determine when a message block of 288 characters has been received. Upon receipt of the 288th character, the character counter 81 will pulse the check initiator 82 to signify that the end of the traffic character block has been reached and that it is now time to prepare the other electronic error control accessories for comparing the check characters.

The check character initiator 82, as its name indicates, initiates a check character comparison between the incoming check characters formed at the transmitting station and those check characters formed in the check one counter 68 and the check two counter 69 at the receiving station. The check initiator 82 sends a pulse to the transfer circuits 53 in the electronic receiver 5 to inhibit operation of the main punch 47 and it also sends a signal to a short block detector 86 to indicate that an end of block has been reached. The check initiator 82 also pulses a control counter 84 which functions in a manner similar to that of the control counter 51 at the transmitting station.

The control counter 84 while operating in similar fashion to the control counter 51 at the transmitting station has fewer stages, viz., three, and is stepped through these stages upon the receipt of each character after the block of 288 traffic characters. The control counter 84 enables a check comparator 85 during its early count and at the end of its count enables a reset 87 to restore all bistable devices to their initial state.

It is in the check comparator 85 that the check characters formed in check one and check two counters 68 and 69 at the receiving station are compared with those check characters formed at the transmitting station. When an agreement has been ascertained for both of the check characters the check comparator 85 is quiescent; but when there is a lack of agreement between either one or both of the check characters, the check comparator 85 will cause an error indicator 83 to be actuated to indicate that an error has been detected.

Error indicator 83 signals the transmitting station that an error has been detected because of a lack of agreement between the check characters undergoing a comparison in the check comparator 85. The transmitting station will, upon receipt of the error signal cause the tape pull-back means to be operated which then will pull back the transmitted message block for retransmission. The error indicator 83, through a rub-out control 89, also enables an additional perforator unit which is separated from the message perforator unit by one message block length of tape. This additional perforator unit is designated as a rub-out punch 48 since it is enabled only after a message containing an error has been detected and only for rubbing out or cancelling the errored block. The rub-out punch 48 deletes the message containing the error by operating all of the punches in each of the eight levels and feeding the tape is synchronism with the punching and tape feeding operations of the main punch 6 as the re-transmitted block is being received. A timing belt (not shown) interconnects the motors of the punches to keep them in synchronism. Thus, due to the storing of a 288 character block of tape between the main punch 47 and the rub-out punch 48, the punching of the first character of the transmitted block is accompanied by a deletion of the first character of the previously transmitted message block in which an error was detected. In addition to indicating a lack of agreement between check characters, the error indicator 83 also indicates an error when the short block detector 86 detects a short block or when the reset 87 causes the error indicator 83 to be enabled.

To keep the transmitting station and receiving station in phase and to assure that only whole message blocks of traffic characters are detected, the short block detector 86 detects when a block of less than 288 characters has been received due to the loss of a character or characters during the transmitting and receiving operations. It will be recalled that the signal monitor 76 receives a pulse every time a character is received in the electronic receiver 5 and that it relays this information to the short block detector 86. The short block detector 86 contains a timer that recycles upon the receipt of a character within a 40 millisecond interval, which is three times the intervals between characters at a transmission rate arbitrarily chosen at 600 words per minute for the present description. In the absence of receipt of a character within 40 milliseconds it will notify the error indicator 83 that the transmitting station has paused in its transmission as though it were at the end of block. If at any time before the 288th characters, the short block detector 86 fails to receive a pulse within the recycle time, the short block detector 86 will, upon timing out, initate the registering of an error signal in the error indicator 83 and enable circuitry whereby, upon receipt of a clock pulse from the main punch, the short block detector 86 will send an output to the transfer circuits 53 of the electronic receiver 5 to cause both the main punch 6 and rub-out punch 48 to cyclically feed the tape therethrough as though traffic characters were being received until the 288th tape feeding cycle occurs. After the character counter 81 has received the 288th pulse, it signals the check initiator 82 to begin the check comparison operation and the check initiator 82 will begin to initiate the reset operation which will disable the short block detector 86 from continuing to cause the feeding of the tape by the main punch 6 and rub-out punch 48.

Operation of reset 87 by the check initiator 82 will cause all the bistable devices in the character counter 81, check initiator 82, control counter 84, check one counter 68, check two counter 69, and error indicator 83 to return to their initial states for reception of the next block of characters.

*Detailed description*

Before beginning the detailed description of the electronic error control accessories shown in detail in FIGS. 4–11, the electronic transmitter will be generally described again to provide a proper operational background for the detailed description. Referring now to FIG. 2, as the tape reader 10 begins to cycle after being turned on, a clock pulse will be generated and fed to the stop timer 13. If the reader is sensing a character at the time the clock pulse is received, a universal contact (not shown) in the tape reader 10 will be closed and the receipt of the outputs of the stop timer 13 and the universal contact will turn on the advance pulse generator control 20. This advance pulse generator control 20 causes the advance pulse generator 11 to generate a reset pulse which sets all elements of the signal register 14 to space. It also causes the sample pulse amplifier 17 to produce a sample pulse which examines the tape reader 10 inputs to the gated pulse amplifiers and integrators 12 so that all levels which are in the marking condition will cause their corresponding levels in the signal register 14 to go to the marking condition. After the reset pulse, the advance pulse generator 11 produces an advance pulse which shifts all the elements of the signal register 14 one level to the right. The advance pulse generator 14 also produces five more advance pulses which will cause the full character to be applied serially to the lines 15 and thence to the digital subset for transmission over voice channels. The next clock pulse that goes in turns off the character advance pulse generator control 20 stopping the oscillator contained in advance pulse generator 11, and the generator control will remain in this stopped position until the tape reader 10 closes the universal contact as it begins reading the next character.

The flip-flops including the one-shot multivibrators have been represented symbolically in the drawings by showing each active element and its associated circuitry as a circle, with the two elements comprising the flip-flop vertically disposed one above the other and interconnected by two lines crossed in an X configuration. An input applied to the control electrode of only one of the active elements has been designated by a line connected directly to the circle representing that particular active element. An input which is symetrically applied to the flip-flop, that is an input applied to the control electrodes of both active elements, is shown in the drawing as being connected to the center or cross point of the X configuration interconnecting the two circles representing the active elements. An output from either of the active elements of the flip-flop is shown by a line connected from the circle representing the element from which it is taken.

The above-described designation for a flip-flop has been used instead of a box merely labeled "FF" or "flip-flop" in order to avoid confusion over which input pulses are applied to which active element and from which particular active elements the outputs are obtained, yet avoiding the detailed circuit diagram of a flip-flop circuit common in the art. The particular configuration shown was chosen since it represents, symbolically, rather closely the common Eccles-Jordan circuit; the circles represent tubes, transistors or other suitable devices and the crossed lines interconnecting them are representative of the interconnections in the Eccles-Jordan circuit between the anode of one tube and the grid of the other or the collector of one transistor and the base of the other.

Referring now to FIG. 5 wherein the electronic error control accessories 2 for the transmitting station are shown in detail, a timing pulse from sample amplifier 17 is applied over lead 18 to resistor 120 and amplifier 119 of a timing control 19 to keep the electronic error control accessories 2 in phase with the electronic transmitter 3 and tape reader 1. The amplifier 119 amplifies the output of the sample pulse amplifier 17 to produce a strong signal for driving "and" gates 127a–h of the signal monitor 23 and flip-flop 144 of a transmit control 44.

To assure the detection of errors by the signal monitor 23 due to dirty contacts, the tape reader 10 has two sets of contacts rather than the normal single pair of contacts operable during a sensing operation. The marking contacts are normally open and will be closed upon the sensing of a perforation in the tape whereas the spacing contacts are normally closed and it is these contacts that are monitored when they become opened upon the sensing of a perforation in the tape. These marking and spacing contacts are of the well-known make-before-break contacts. The reason for monitoring the space contacts rather than the mark contacts is to detect an error in case of a simultaneous open condition on both the mark and space contacts resulting from dirty contacts since it is unlikely that both the contacts at the marking and spacing contacts will become dirty at the same time.

"And" gates 127a–h of the signal monitor 23 sample the leads 23a–h which extend from the spacing contacts in the reader 10 to the RC circuits 126 and "and" gates 127a–h of the signal monitor 23.

When a mark is being sensed on a particular level at the tape reader 10, the particular "and" gate 127a–h associated with that level is primed and a positive pulse output is produced when the driving pulse is received from amplifier 119 of the timing control 19. These positive pulse outputs in the respective levels are used to drive the flip-flop 129a–h of the check one counter 29 wherein an odd-even summation of the number of marks in each level is being maintained over the entire block of 288 traffic characters.

The check one counter consists of eight binary element flip-flop 129a–h, that change state upon receipt of a positive pulse from their respective "and" gates 127a–h in the signal monitor 23 for each and every perforation that is detected in that level of the tape during the traffic block.

In order to protect against equipment errors and to send out a signal regardless of whether or not the circuit of a particular level has received any pulses which might happen because of an equipment failure during a whole block of transmission of characters, the flip-flops 129a–h are originally set in a position that will cause a mark to be sent out. The positioning of the flip-flops 129a–h in their upper or marking state, as shown in FIG. 5, to give a pulse at the end of the message block even though they are not pulsed, has been designated as odd parity. The outputs of the check one flip-flops 129a–h are sent over leads 132a–h to prime the check one "and" gates 165a–h (FIG. 6) and over the leads 131a–h to drive flip-flops 133a–h of check two counter 33.

The check two counter 33 is similar to the check one counter 29 in that it is composed of eight flip-flops, 133a–h, which change their state upon a receipt of a positive pulse. However, since it takes two inputs to operate the check one counter 29 to make it send out one output pulse, it is readily apparent that the check two counter 33 receives only one-half as many inputs as does the check one counter 29 and therefore changes state only one-half as many times. Also, the check two counter 33 is similar to the check one counter 29 in that its output is used to prime its check two "and" gates, 168a–h. The check one and check two counters 29 and 33 continue to count the marking pulses in each level until an end of block is reached.

A mechanical counter of the tape storage and feed-out control 77 in the reader error control accessory block 4 counts each character as it is being sensed by the tape reader 10; and after the counter has registered the sensing of 288 characters, it opens a counter contact 141 in the tape reader operating circuit to cause the tape reader 10 to stop sensing the tape. Simultaneously, the swinger of contact 141 connects ground coming over a now closed start switch 149 to lead 142 to turn on amplifier 143 of transmit control 44, which it will be recalled, initiates the transmission of the check characters. Amplifiers 143 supplies a positive transition to flip-flop 144 to change the state of flip-flop 144, which, as it changes state, changes the voltage on a lead 145 from negative to ground to prime "and" gate 146. Having been primed, "and" gate 146 can now be driven by a positive pulse from the timing control amplifier 119 to produce an output to drive flip-flops 152–157 of the control counter 51. Further, outputs from amplifier 119 will be spaced a character interval apart due to their initial derivation from the timing control 19. The outputs of flip-flop 144 and "and" gate 146 are sent over leads 147 and 148, respectively, to the control counter 51.

The control counter 51 functions to obtain the proper timing between the transmission of the last traffic character in the message block of 288 characters and the transmission of the check characters from the check one and check two counters 29 and 33. Since the release time of the operating magnet (not shown) of the tape reader 10 is such that the counter contact 141 must be opened before the last traffic character of the message block is transmitted, the control counter 51 must delay the initiation of check character transmission until the last traffic character is transmitted. Also the character counter 51 must provide for a delay of two character intervals which is necessary for the recognition and comparison of the transmitted check character by a comparing means at the receiving station, as will be brought out more fully hereinafter. The control counter 51 inserts these delays by means of a six stage shift register comprising flip-flops 152–157.

After the mechanical counter closes the contact 141 to apply ground to amplifier 143 to drive flip-flops 144 of the transmit control 44 to transmit a positive transition for application to flip-flop 152 of the control counter 51, flip-flop 152 changes state and remains in this condition until the first positive pulse is received from "and" gate 146. At this time, flip-flop 152 changes back to its original state and simultaneously causes a positive pulse to be applied to the input of flip-flop 153, which will then change its state and hold it changed for a period of one character cycle. At this time, a positive pulse from "and" gate 146 will change flip-flop 153 back to its original state and simultaneously cause flip-flop 152 to change state. This process of shifting a pulse from one stage to the next will continue until all the stages have changed state once. When flip-flops 155 and 156 change state, their outputs will go over leads 158 and 160, respectively, to "or" gate 159 of the check two gates 36 and flip-flop 156 divides its output at lead 161 and a resistor 162 to furnish a pulse to amplifier 163 to drive the check one "and" gates 165a–h. Similarly, the output of flip-flop 157 goes through a resistor 166 and amplifier 167 to drive "and" gates 168a–h of the check two gates 36. Additionally, flip-flop 157 conveys an output over lead 174 to one shot flip-flop 175 of the reset 61.

The check one "and" gates 165a–h sample the various levels of the check one counter 29 to determine what levels of the check character are marking and this is determined by whether or not there is an odd or even count of marking pulses received in that particular level. If an even number of marking pulses have been received in a level, the check one gate for that level will receive a priming pulse, whereas, when an even number of marking pulses have been received in a level, its associated check one gate will not be primed. When the flip-flop 156 of the control counter 51 changes state, an output is generated and goes to amplifier 163. Upon the occurrence of a drive pulse from amplifier 163, those of the check one gates 165a–h which are primed produce a positive pulse which goes to the "or" gates 169a–h of the check transfer 63 for transmission as marking pulses in the horizontal parity check character.

In a like manner, the check two "and" gates 168a–h sample the "flip-flops" 133a–h of the check two counter 33 to determine which levels of the check character should be marking because they have recorded an odd number of marking pulses. The check two "and" gates 168a–h are primed by the binary elements of the flip-flops 133a–h, and one character's duration later, when flip-flop 157 changes state, the output of amplifier 167 will go negative and all of check two "and" gates 168a–h will receive a negative pulse. Only those "and" gates 168a–h that have been primed will have an output for the "or" gates 169a–h of the check transfer 63 for transmission of the binary horizontal parity check characters.

The check transfers 63 transfers the check characters to the signal register 14 of the electronic transmitter 3 for both the horizontal and binary horizontal parity check characters and furnishes a pulse to initiate transmission in lieu of the universal pulse normally supplied by the reader. As described earlier, the output pulses from flip-flops 155 and 156 of the control counter 51 are spaced one character cycle apart and go through "or" gate 159 to prime "and" gate 170 of the check transfer 63 for a one character cycle or duration before each check character is transmitted. The drive pulse for "and" gate 170 comes from an amplifier 171 when amplifier 171 receives a pulse from the advance pulse generator control 20 of the electronic transmitter 3 as a clock pulse is priming the advance pulse generator control 20. The output of "and" gate 170 is used to drive the previously primed advance pulse generator control 20 of the electronic transmitter 3 which drives the advance pulse generator 11 to reset the signal register to zero. Since the signal register 14 has been reset to zero, those levels of the signal register 14 receiving a pulse from "or" gates 169a–h of the check transfer 63 will be set to a condition which is associated with a marking condition and those levels not receiving a pulse from the "or" gates 169a–h of check transfer 63 will remain in their reset positions which is the spacing condition. Accordingly, as the advance pulses are received from the advance pulse generator 11, those levels of the stored check character in the signal register 14 will be shifted to the right in timed relationship and out over the line as seriatim marking and spacing pulses. Thus, the horizontal and binary horizontal parity check characters are taken from the check transfer 63 and sent over parallel leads to the signal register 14 for seriatim transmission over lead 15 to the digital subset for transmission over voice channels.

When the last stage of the control counter 51, namely, flip-flop 157, initiated the sending of the second check character from the check two gates 36, it also initiated the reset operation by supplying a positive pulse to a one-shot multivibrator 175 of reset 61.

The reset 61 is composed of the one-shot multivibrator 175 and an associated amplifier 191 which are used to notify an end of message relay 192 of the digital subset control 62 that the transmission cycle consisting of: 288 characters, a pulse of two character duration, and two check characters; has been completed and to reinstate all circuits to their initial condition. The reset 61 is set into operation at the end of the control counter cycle when flip-flop 157 supplies a positive pulse to the one-shot multivibrator 175. At the end of a predetermined time, which consists of a two character pause, one-shot multivibrator 175 produces a negative pulse to drive amplifier 176 which supplies an appropriate voltage over lead 177 to reset all bistable circuits in the electronic error control circuitry.

Also, one-shot multivibrator 175 sends a reset pulse to flip-flop 181 of the start reader control 71.

Upon receipt of the reset pulse, the start reader control 71 causes the tape storage and feed-out 77 to operate the tape reader 10 to sense the next message in the tape. Upon receipt of this reset pulse from amplifier 176 of reset 61, flip-flop 181 of the start reader control 71 changes state and turns on amplifier 182 to energize counter start relay 183, which upon being operated, closes contact 184 to complete a circuit for operating relay 150 of the reader 10 that by-passes the now open mechanical counter contact 141 in the tape reader operating magnet circuit. The operating circuit for operating relay 150 includes ground, counter start contact 184, now closed, coil of operating relay 150 to negative battery. If channel facilities are available, the tape reader 10 starts sensing the tape again. After the sensing of the first eighteen characters, the mechanical counter closes the counter contact 141 to hold the tape reader operating magnet coil energized during the sensing of the remainder of the 288 characters in the block. The circuit completed by closure of counter contact 141 includes ground, tape out contact 149, now closed, counter contact 141, now closed, coil of operating relay 150 and negative battery. Concomitantly with the closure of contact 141 by the mechanical counter, the feed-out contact 185 was opened by the mechanical counter and caused amplifier 186 to furnish a positive pulse to return flip-flop 181 to its original condition. Thereupon, counter start relay 183 dropped out and counter contact 141 was no longer by-passed.

If there was a lack of agreement between the check characters at the receiving station, as will be described in detail hereinafter, the receiving station will send a signal to the transmitting station's rerun control 74 to signify that retransmission of the errored block is desired. The rerun control 74 has an amplifier 188 which upon receipt of an error signal from the receiving station energizes a relay 189a to close its contacts and operate a pull-back magnet 189 of the tape pull-back mechanism shown in the aforementioned De Boo patent. The tape pull-back mechanism then pulls back the tape in storage to the first character in the error block for resensing by the tape reader 10.

The digital subset control 62 conditions the digital subset for sending of characters over the voice channels to the receiving station and for conditioning the digital subset to receive a signal from the receiving station indicating an error after the check comparison cycle is completed at the receiving station. An amplifier 191 is normally turned on during the transmission of the message block and is normally energizing a relay 192. During the message traffic, relay 192 is operated and its swinger 193 is supplying ground to a "request to send" circuit in the digital subset. At the end of the transmission cycle of the message characters and the check characters, the one-shot multivibrator 175 of reset 61 times out for a predetermined interval and the amplifier 191 no longer energizes relay 192, which, as it releases, moves swinger 193 upwardly to place ground on its upper contact and over its associated lead to activate the "end of block" circuit in the digital subset. The digital subset is now in condition for receiving a signal from the receiving station if an error has been detected at the receiving station. When the one-shot multivibrator 175 times out, amplifier 191 is driven on and relay 192 moves swinger 193 to apply ground to the "request to send" circuit in the digital subset.

The receiving station to be hereinafter described contains many features similar to those at the transmitting station and hence need be described with less detail for a full understanding thereof.

It will be recalled from the general description that the serial signals on the line enter the electronic receiver 5 which functions to convert the incoming serial signals to parallel output signals which are temporarily stored in a storage register 45 until a transfer pulse is sent from the main punch 47 to transfer the traffic to the main punch 47. The traffic character received in the receiving station will have had their serially transmitted code combinations of marking and spacing pulses translated into parallel pulses and those levels that are marking will have caused an energization pulse to be sent to their respective magnet pulsers 207a–h (FIG. 8) which are monitored by "or" gates 222a–h of the signal monitor 76. The magnet pulsers 207a–h control movement of punch pins to punch a tape and these magnet pulsers in the main and rub-out punches are of the type shown in United States Patent No. 2,675,078 issued April 13, 1954 to W. J. Zenner. The main punch 47 and the rub-out punch 48 have their driving motor synchronized by a timing belt extending between the driving motors for the punches 47 and 48. The rub-out punch must be kept in synchronism with the main punch since it is enabled for full block length rub-out operation. Hence, if the rub-out punch does not begin its rub-out operation at the beginning of a new block, it will rub-out parts of two adjacent blocks, leaving only portions of adjacent messages intact. A length of tape is physically stored between the point of punching by the first punch and the point of punching by the second punch.

In FIG. 7, the magnet pulsers 46 and the signal register 72 of the electronic receiver 5 are shown in detail since the magnet pulsers 46 furnish the eight level inputs of the message characters to error control accessories 8, and the signal register 72 furnishes the eight level inputs for the check characters to error control accessories 8. Also, shown to the left of the dotted line in FIG. 7 separating the electronic receiver 5 and the error control accessories 8, are shift and set delay circuits 52, the transfer contacts 53, and main punch 47, each of which furnishes timing and/or driving pulses to the electronic error control accessories 8 as will be brought out more fully hereinafter.

The signal monitor 76 of the receiving station determines when a character is received and what levels are marking. Voltage dividers shown in the circuits of the magnet pulsers 207a–h for the tape punches produce a positive transition at the "or" gates 222a–h whenever the punch magnets are energized by a marking pulse. While this manner of detecting when a punch is operated is generally satisfactory, it is also possible to place a contact on the punch itself to produce a positive transition whenever the punch is actuated, thereby also checking the reliability of the operation of the punch magnet and the associated linkage connecting the punch pin.

To drive "and" gates 218a–h of the signal monitor 76 there is provided a timing control 75 that receives a timing pulse from the delay circuit 52 in the electronic receiver 5 and which amplifies this pulse sufficiently to drive the primed "and" gates 218a–h of the signal monitor 76 at the appropriate time.

Those of the "or" gates 222a–h receiving positive transitions as a result of marking pulses being detected in their respective levels will energize their respective flip-flops 227a–h (FIG. 9) in the check one counter 68. The check one counter 68 has flip-flops 227a–h one of which is in each level and these change state with each marking pulse in a manner similar to that of those flip-flops in the check one counter 29 at the transmitter station. In a like manner, the check one counter 68 sends its outputs to the check two counter 69 which has flip-flops 228a–h similar to those in the check two counter 33 of the transmitter. However, rather than sending the outputs of these counters to check one and check two gates as in the transmitting station, the outputs of the check one and check two counters 68, 69 are sent to a check comparator 85 for comparison with the transmitted check characters for the block of characters just received.

The feed magnet 208 of the tape punch, which operates each time a code combination is punched, is monitored by a voltage divider 209 which sends a positive pulse to an "or" gate 221 in the signal monitor 76 each time the tape is fed. The output pulse of "or" gate 221 is inverted by an amplifier 223 and then amplified by amplifiers 224 and 225. Amplifier 224 samples "and" gate 204 of the character counter 81 and amplifier 225 samples "and" gate 239 of the check initiator 82 and supplies a pulse to amplifier 255.

The character counter 81 is a gated binary counter having a series of flip-flops 229 that change count as they are pulsed by "or" gate 221 in the signal monitor 76 each time the feed magnet of the main punch 47 is energized and hence the counter 81 counts through the entire 288 characters constituting the message block. Receipt of the 288th character causes the character counter 81 to transmit a positive pulse to drive an "and" gate 230 of the check initiator 82 to cause it to begin the check character comparison operation.

The check initiator 82 functions to initiate the checking of the incoming check characters formed at the transmitting station with those formed in the receiving station. When the positive pulse, sent from the character counter 81 drives the previously primed "and" gate 230 in the check initiator 82, a one-shot multivibrator 231 is triggered causing it to time out. At the end of the timing cycle of the one-shot multivibrator 231, it produces a positive pulse which causes a flip-flop 232 to change state. The output of flip-flop 232 in its normally "on" state drives an amplifier 233, and when flip-flop 232 changes state, it drives amplifiers 234 and 235. The output of amplifier 233 goes over leads 236, 237 and 238 to prime an "and" gate 239. Amplifier 233 also sends a pulse over lead 241 to the input of a transfer amplifier (not shown) in the transfer circuits 53 of the electronic receiver 5 to inhibit the punches. Amplifier 235, which also is driven by the flip-flop 232 in the check initiator 82, supplies a priming voltage over lead 270 which is amplified by amplifier 271 and primes the "and" gates 218a–h of the signal monitor 76. Amplifier 234, which is driven at the same time as amplifier 235, supplies the priming voltage for "and" gate 204 of the character counter 81 and for the "and" gate 258 of the short block detector 86 at the end of the check initiator cycle to prepare the counter 81 and the short block detector 86 for a new counting operation.

The control counter 84 at the receiving station operates in a manner similar to the control counter 51 at the transmitting terminal but has fewer stages. The first stage, a flip-flop 242, is turned on by a pulse from amplifier 233 of the check initiator 82 and is stepped through its stages upon receipt of a pulse from one-shot multivibrator 240 of the check initiator 82 for each character that is received after a block of 288 traffic characters. The first character to be received is the horizontal parity check character which causes the flip-flops 214a–h and flip-flop 213 in the signal register 72 to change states. Changing of the state of flip-flop 213 drives "and" gate 219 previously primed by amplifier 235 of the check initiator 82. "And" gate 219 in turn drives "or" gate 221 to furnish a pulse for amplification by amplifier 225. Amplifier 225 drives "and" gate 239, which was previously primed by amplifier 233 of the check initiator 82, and "and" gate 239 drives the one-shot multivibrator 240. The second parity check character, viz., the binary horizontal parity check character, will also pulse one-shot multivibrator 240 in a similar manner to drive the second stage flip-flop 243 of the control counter 84.

The second stage, a flip-flop 243 of the control counter 84, sends its output over lead 246 to drive an "and" gate 249 of the check comparator 85 and the outputs of flip-flop 244 go to "and" gate 250 of the check comparator 85 and to an "and" gate 284 of reset 87.

It is in the check comparator 85 that the check characters formed at the receiving station are compared with those received from the transmitting station at the end of the traffic block. It will be remembered that the check characters are received in the flip-flops 214a–h of the signal register 72 and are sampled by "and" gates 218a–h of the signal monitor 76. Those flip-flops 214a–h in the signal register 72 receiving a marking pulse will send an output to their respective "and" gates 218a–h. To drive "and" gates 218a–h at the appropriate time, a timing pulse from the set and delay circuits 52 (FIG. 7) in the electronic receiver 5 is sufficiently amplified by timing control 75 to drive those "and" gates 218a–h previously primed by the receipt of a marking pulse in their respective level of the check character. Outputs of the driven "and" gates 218a–h go to the "or" gates 222a–h wherein a positive transition occurs to change the state of the flip-flops 227a–h associated with a level receiving a marking signal.

The levels of the check character having a marking pulse indicate that the respective binary counters in these levels at the transmitting station had counted an odd number of marking pulses. Similarly, if there was no error in transmission, these same levels at the receiving station indicate that an odd number of marking pulses have been counted by having their respective flip-flops in the marking or "1" condition. Thus, there should be an incoming marking pulse in the check character for each of the flip-flops 227a–h that are in the marking or "1" condition. As seen above, the marking pulses of the check character received in the signal register 72 cause their respective gates of the "and" gates 218a–h and 222a–h to furnish a pulse to change the state of the flip-flops 227a–h in these levels. Because the flip-flops in the levels receiving a pulse initiated by the check character should be in the marking state, these flip-flops will be changed to a spacing or "0" condition. Accordingly, after receipt of the check character, all of the flip-flops 227a–h should be in their "0" or spacing condition. If flip-flops 227a–h are not all in the "0" state, it will be because a marking pulse was present in a given level of the check character and the flip-flop at the receiving station for that given level was in "0" or spacing state and is driven by the incoming marking pulse to a "1" or marking condition, or, conversely because a spacing pulse was present in a given level of the check character and the flip-flop at the receiving station for that level was in the "1" or marking state and was not driven to the "0" or spacing state.

"And" gate 247 in the check comparator 85 receives the eight inputs from the check one counter 68 and produces a negative output only when all eight inputs are negative. This negative output inhibits "and" gate 249 from giving an output when it receives its negative drive pulse from flip-flop 243 in the control counter 84. However, when an error appears, "and" gate 249 will not be inhibited and when it receives its negative drive pulse from flip-flop 243 of the control counter 84, it will send an output to an "or" gate 266 in the error indicator 83.

Similarly, when the binary horizontal check character has been received all of the flip-flops 228a–h should be driven to their "0" or spacing states and an "and" gate 248 receives the eight inputs from the flip-flops 228a–h of check two counter 68. When an error appears in the check two counter 69, the output of "and" gate 248 is at ground and when "and" gate 250 receives its negative drive pulse from flip-flop 244, "and" gate 250 will pulse "or" gate 266 in the error indicator 83.

The short block detector 86 detects blocks of traffic that contain less than 288 characters because of the loss of characters in the transmitting or receiving operations. "Or" gate 221 of the signal monitor 76 sends a pulse over line 226 through amplifiers 223 and 225 to amplifier 255 every time a character is received in the electronic receiver 5. Amplifier 255 inverts and amplifies these signals and sends them to a retimer 256, which has a squaring circuit with an integrating circuit at its input. Upon receipt of a pulse from amplifier 255, the integrating circuit charges up and retimer 256 turns on for approximately 40 milliseconds until the voltage at the output of the integration circuit falls below a certain level. If during the discharge of the integrating circuit, another pulse is received, the integrating circuit is fully charged again, and holds for the recycling time of 40 milliseconds. In normal operation, pulses will be received every 13 milliseconds, during receipt of traffic characters, at the arbitrary transmisison rate of 600 words per minute. The recycling retimer 256 will stay on during this period. Whenever retimer 256 is on, it drives amplifier 257, the output of which inhibits reset 87 so long as the retimer is being recycled, or in other words, as long as traffic continues. But when traffic stops for a period of 40 milliseconds, the retimer 256 which has been recycling once every 13 seconds during normal traffic, will turn off and this turning off of retimer 256 is used to drive "and" gate 258 of the short block detector 86.

It will be remembered that "and" gate 258 has been primed by amplifier 234 of the check initiator 82 during the previous reset pulse and it continues to prime "and" gate 258 until receipt of 288 characters. Thus, irrespective of how short the block is, the short block detector 86 will be notified. Upon being notified of a short block condition by the turning off of retimer 256, "and" gate 258 will send its output over lead 259 to "or" gate 266 of the error indicator 83 and over another lead of a flip-flop 261 which primes an "and" gate 262. The function of "and" gate 262 is to continue to pulse the tape feed mechanism of the main punch 47 and the rub-out punch 46 even though no traffic characters are coming in. Having been primed by flip-flop 261 in the short block detector 86, the "and" gate 262 is now capable of being driven by its other input which comes from amplifier 263. Amplifier 263 amplifies the pick-up pulse generated by the main punch 47 (FIG. 7) and sends a pulse to drive "and" gate 262 which sends its output to the transfer contacts 53 (FIG. 7) in the electronic receiver 5, which in turn cause the driving of the tape feed mechanism of the main punch 7. The short block detector 86 will continue to be pulsed by the pick-up pulse and continues to pulse the tape feed mechanism through to the 288th character. When character counter 81 has counted the 288th character, it causes flip-flop 232 of the check initiator 82 to send an inhibit signal through amplifier 233 to flip-flop 261 of the short block detecor which takes the prime off of "and" gate 262 to stop the tape feeding operation.

The function of the error indicator 83 is to signal the transmitting station that an error has occurred. The error indicator 83 has an "or" gate 266 that receives a pulse whenever an error is detected in any one of the check comparator 85 short block detector 86, and reset 87 circuits. "Or" gate 266 pulses flip-flop 267, which when it changes state, has an output that is sent to the digital subset for sending an error signal to the transmitting station and to the flip-flop 268 in the rub-out control 89.

The rub-out control 89 controls the rub-out punch 48 to effect the deletion of the errored block by over-punching all levels, thereby assuring a perforation in each level for each character of the previously punched tape. This results in a block of 288 "LTRS" characters. Transfer pulses from the transfer contacts 53 (FIG. 7) in electronic receiver 5 are used to drive an "and" gate 278 and a one-shot multivibrator 276 in the rub-out control 89. When "and" gate 278 has been primed by the flip-flop 268 of rub-out control 89, the transfer pulse from the electronic receiver 5 drives "and" gate 278 to produce an output for driving one-shot multivibrators 279a–h which energize the interposer magnets 290 in the rub-out punch 49 to punch all eight levels in the tape. One-shot multivibrator 276 energizes the tape feed magnet 277 to feed the tape forward for each character being over-punched in the rub-out punch 49.

Whether an error has been detected or not, it is necessary at the end of a transmission cycle to reset all of the bistable devices to prepare for the next block of characters, be it a retransmtited or new block of characters. Accordingly, after the receipt of the 288th character, character counter 81 starts the check initiator 82 which as it times out has its amplifier 233 turn on the one-shot multivibrator 282 of the reset 87 to start timing out the reset operation.

Concomitantly with the turning on of the one-shot multivibrator 282, amplifier 233 primes an "and" gate 283 which will be driven by a pulse from one-shot multivibrator 282 when it times out. "And" gate 283 in turn will energize a one-shot multivibrator 285 which as it times out supplies the reset pulse to an amplifier 286 for distribution to all of the bistable devices of the error detection and correction facilities. However, in normal operation, the energizing pulse for one-shot multivibrator 285 does not come from "and" gate 283 but from "and" gate 284. The priming pulse for "and" gate 284 comes from retimer 256 which stopped recycling because of the lack of incoming traffic characters. As the retimer 256 turns off after a forty millisecond interval during which the two character duration pause and one check character duration have expired, the "and" gate 284 will be primed before the flip-flop 244 of the control counter supplies the driving pulse to "and" gate 284. The "and" gate 284 pulses one-shot multivibrator 285 and when one-shot multivibrator 285 times out, its output is amplified by amplifier 286 and is distributed to all of the bistable devices to reset them. The resetting of flip-flop 232 in the check initiator 82 removed the priming voltage from "and" gate 283, and thus prevented its being driven when one-shot multivibrator 282 has timed out. The timing cycle of one-shot multivibrator 282 is sufficient to allow normal reset by "and" gate 284 but if this "and" gate does not initiate reset before one-shot multivibrator 282 times out, then one-shot multivibrator 282 will drive one-shot multivibrator 285 to furnish the reset pulse for the bistable devices. For example, if the block of traffic being received had more than 288 characters in it, retimer 256 would not turn off and would continue to inhibit "and" gate 284, therefore permitting one-shot multivibrator 282 to drive its "and" gate 283 to cause the resetting operation by one shot 285.

Although only one embodiment of the invention is shown in the drawings and described in the foregoing specification it will be understood that the invention is not limited to the specific embodiment but is capable of modification and rearrangement and substitution of parts and elemnets without departing from the spirit of the invention.

What is claimed is:

1. In a communication system having error detection and correction facilities wherein a plurality of code bits having different polarities are permutatively combined to represent a character and a predetermined number of characters constitute a message block, an error detection and correction system comprising, means for sensing a message tape and for transmitting said code bits, a counting means monitoring said transmitting means and counting the code bits of one polarity over a message block, a receiving means including means for recording said code bits in a recording medium, a counting means monitoring said receiving means and countting said code bits of said one polarity in a message block, deleting means operable in synchronism with said recording means to effectively delete a message block containing an error, and means for comparing the counts of said counting means and, upon disagreement of said counts, for initiating the simultaneous deletion by said deleting means, of the message block in the record medium containing an error and for re-recording of the transmitted message block by the recording means in a different portion of said recording medium.

2. In the communication system of claim 1, having error detection and correction facilities, wherein said counting means for counting the number of code bits of one condition being transmitted includes electronic flip-flops shiftable from one state to another state to count the code bits of one polarity, said counting means for counting the bits received and recorded in said recording medium includes electronic flip-flops shiftable from one state to another state to count the code bits of one polarity, and said comparison means for comparing the counts of said counting means includes electronic gates.

3. In a tape-to-tape communication system having a transmitting station for transmitting to a receiving station and wherein the intelligence is transmitted in the form of code bits having either one of two conditions, a transmitting means for transmitting the code bits including a tape sensing means for sensing said code bits representative of said characters in said tape, and receiving means including recording means for recording said bits in a tape, the improvement comprising an error detection and correction system comprising counting means for counting the number of code bits of one condition being transmitted by said transmitting means, a character counter for counting the number of characters transmitted and operable after counting a predetermined number of characters to disable said tape sensing means and enable the transmitting means to transmit a character representative of said count by said bit counter means, a deleting means at the receiving station selectively operable to delete said bits previously recorded by said recording means in said tape, a counter for counting the bits of said one condition received and recorded in said tape, a character counter for counting the number of message characters received and upon the receipt of a predetermined number of characters to blind said recording means, and a synchronizing driving means for driving said recording and deleting means for maintaining recording means and deleting means in a predetermined relationship with respect to the tape.

4. In a tape-to-tape communication system having error detection and correction facilities and a transmitting station for transmitting intelligence to a receiving station and wherein the intelligence is in the form of code bits having either one of two conditions, a transmitting means for transmitting the code bits including a tape sensing means for sensing said code bits representative of said characters in said tape, counting means for counting the number of code bits of one condition being transmitted by said transmitting means, means for disabling said tape sensing means and enabling the transmitting means to transmit a check character representative of the count by said counter means after a predetermined number of message characters have been transmitted, a receiver including a tape recording means for recording said bits in a tape, counting means for counting the bits of said one condition as said bits are recorded in said tape, a character counter for counting the number of message characters received, means for blinding said tape recording means upon the receipt of a predetermined number of message characters, and a comparison means operable by said character counter to compare the transmitted check character with the count in said counting means at the receiving station.

5. In the tape-to-tape communication system of claim 4, having error correction and detection facilities, wherein said transmitting means includes an electronic distributor for transmission of said code bits at high speed, said counting means includes electronic flip-flop circuits for counting at high speeds the number of code bits of said one condition, said counting means for counting the bits received and recorded in said tape include electronic flip-flop circuits capable of high speed counting by changing from one state to another state, and said comparison means includes electronic gates for rapidly comparing the counts of said flip-flop circuits.

6. In a tape-to-tape communication system including error detection and correction facilities and a transmitting station for transmitting intelligence to a receiving station and wherein the intelligence is in the form of code bits having either one of two conditions, a transmitting means for transmitting the code bits including a tape sensing means for sensing said code bits representative of said characters in said tape, counter means for counting the number of code bits of one condition being transmitted by said transmitting means, a character counter for counting the number of characters transmitted means operable after a predetermined number of characters have been transmitted for disabling said tape sensing means and for enabling the transmitting means to transmit a character representative of the count by said counter means, a receiver including a cyclic recording means for recording said bits in said tape, counter means for counting the bits received and recorded in said tape, a character counter for counting the number of cycles of said recording means and operated after the counting of a predetermined number of cycles to blind said recording means, a driving means for driving said recording means, and means for determining the receipt of successive characters during a predetermined time interval and, upon non-receipt of a character within the predetermined interval, for causing said driving means to cycle said recording means until said character counter counts through said predetermined number of cycles.

7. In a tape-to-tape communication system having a transmitting station for transmitting intelligence to a receiving station and wherein the intelligence is in the form of code bits having either one of two conditions, an error detection and correction system comprising a transmitting means for transmitting the code bits including a tape sensing means for sensing said code bits representative of said characters in said tape, counting means for counting the code bits of one condition being transmitted by said transmitting means, means for counting the number of characters being transmitted and operable, after a predetermined number of characters, for disabling said tape sensing means and enabling the transmitting means to transmit a check character representative of the count by said counter means, a receiver including a main recorder for recording said bits in a tape, means for deleting said characters from said tape, said deleting means operating on said tape at a fixed predetermined distance from said main recorder, a counter for counting the bits received and recorded in said tape, a character counter for counting the number of message characters received and upon the receipt of a predetermined number of characters to blind said recording means, synchronized driving means for driving said main recorder and deleting means, and means for energizing said driving means for driving said main and rub-out recorder and deleting means after a predetermined time interval elapses without the receipt of a character.

8. In a tape-to-tape communication system including error detection and correction facilities and a transmitting station for transmitting intelligence to a receiving station and wherein the intelligence is in the form of code bits having either one of two conditions, a transmitting means for transmitting the code bits including a tape sensing means for sensing said code bits representative of said characters in said tape, first counter means for counting the number of code bits being transmitted by said transmitting means, means for counting the number of characters transmitted and, after counting a predetermined number of characters, for disabling said tape sensing means and enabling the transmitting means to transmit a check character representative of the count by said bit counter means, a receiver including a main tape recorder for recording said bits of intelligence in a tape, second counter means for counting the bits received and recorded in said tape, means for counting the number of message characters and upon the receipt of a predetermined number of characters for blinding said recording means to said check character, a rub-out tape recorder operable to rub out a character in the tape, said rub-out recorder located in spaced relation to said main tape recorder to provide for storing of a length of tape having said predetermined number of characters between said main and rub-out recorders, synchronized driving means for driving said main recorder and said rub-out recorder, and a comparator operable by said character counter to compare the transmitted check character with the count in said second counter means and operable upon non-agreement of said check characters to notify the transmitting station to retransmit the message and to actuate said rub-out recorder to delete the predetermined number of characters existing between the rub-out recorder and the main recorder while the main recorder is recording the retransmitted message.

9. In a communication system having error detection and correction instrumentalities and wherein a plurality of code bits having different polarities are permutatively combined to represent a character, a tape reader transmitter for sensing a recorded tape and transmitting a plurality of code bits representative of a plurality of characters, a first registering means monitoring the transmitted code bits of the plurality of characters and effective to form parity check bits representative of the summations of the code bits in each level of the characters transmitted, means for receiving the transmitted code bits representative of said characters and recording said bits in a tape, a second registering means monitoring the code bits received by said recorder and effective to form parity check bits representative of the summations of the code bits in each level of the characters received, means for comparing these bits representing the summations of code bits formed at the transmitter and at the recorder, means for notifying the tape reader transmitter of a lack of agreement in the summations being compared, a tape pull-back means connected to the tape reader transmitter for pulling back the previously sensed tape and initiating another cycle of the tape reader transmitter to transmit the characters previously transmitted, and means for obliterating the characters previously received and recorded in the tape concomitantly with the recording of the retransmitted characters.

10. In a communication system having a transmitting station for transmitting intelligence to a receiving station wherein the intelligence is in the form of code pulse signals having one of two states permutatively combined to form characters, an error detection and correction system comprising, a first set of binary counters at the transmitting station each counter individual to one of the code pulse signals for making a binary summation of one of the states of said transmitted code pulse signal, means at the transmitting station individual to each code pulse signal for making a binary summation of the whole number of pairs of one of the states of one of the transmitted code pulse signals, a first set of binary counters at the receiving station each counter individual to one of the received code pulse signals for making summations of said one of the states of the received code pulse signal, means at the receiving station individual to each code pulse signal for making summations of the whole number of pairs of said one of the states of each of said received code pulse signals, and means at the receiving station for comparing the summations of said first set of binary counters and for comparing the summations of the second set of binary counters.

11. In an error detection and correction system for a block of characters transmitted as intelligence signals having one of two states in each level comprising a signal generating means for transmitting the intelligence signals, a plurality of first bistable devices each one of which monitors a level of the characters and binarily counts one of the two states of the intelligence signals being transmitted in its associated level over the block of characters, a plurality of second bistable devices each one of which individually monitors one of said first bistable devices and binarily counts the changes of state of said first bistable devices, and means for stopping said signal source from further transmission at the end of the block of characters and for enabling the transmission of the resultant binary count of the first bistable devices as a first parity check character and the transmission of the resultant binary count of the second bistable devices as a second parity check character.

12. The error detection and correction system according to claim 11 wherein there is provided a receiver for recording on a recording medium the intelligence signals, a plurality of first bistable registers each one of which monitors a level of the characters and binarily counts one of the two states of the intelligence signals being received, a plurality of second bistable registers each one of which monitors one of said first bistable registers and binarily counts the changes of state of said first registers, and comparing means operable at the end of the block of characters to compare each of the binary counts of said first bistable devices with the binary counts of said first bistable registers and each of the binary counts of said second bistable devices with the binary counts of said second bistable registers.

References Cited by the Examiner
UNITED STATES PATENTS

| | | | |
|---|---|---|---|
| 2,939,116 | 5/1960 | Burns et al. | 340—146.1 X |
| 2,993,956 | 7/1961 | Steeneck | 340—146.1 X |
| 3,001,017 | 9/1961 | Dirks | 178—23.1 |
| 3,008,004 | 11/1961 | Young | 178—23.1 |

ROBERT C. BAILEY, *Primary Examiner.*

MALCOLM A. MORRISON, *Examiner.*